US009860601B2

United States Patent
Soon-Shiong

(10) Patent No.: US 9,860,601 B2
(45) Date of Patent: *Jan. 2, 2018

(54) VISUAL HASH TAGS VIA TRENDING RECOGNITION ACTIVITIES, SYSTEMS AND METHODS

(71) Applicant: NANT HOLDINGS IP, LLC, Culver City, CA (US)

(72) Inventor: Patrick Soon-Shiong, Los Angeles, CA (US)

(73) Assignee: Nant Holdings IP, LLC, Culver City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/362,618

(22) Filed: Nov. 28, 2016

(65) Prior Publication Data

US 2017/0078756 A1    Mar. 16, 2017

Related U.S. Application Data

(63) Continuation of application No. 14/564,448, filed on Dec. 9, 2014, now Pat. No. 9,544,655.

(Continued)

(51) Int. Cl.
| | |
|---|---|
| *H04N 5/445* | (2011.01) |
| *H04N 7/173* | (2011.01) |
| *H04N 21/482* | (2011.01) |
| *H04N 21/266* | (2011.01) |
| *H04N 21/2665* | (2011.01) |

(Continued)

(52) U.S. Cl.
CPC ..... *H04N 21/4826* (2013.01); *G06K 9/00718* (2013.01); *G06K 9/00744* (2013.01); *H04N 21/2353* (2013.01); *H04N 21/2385* (2013.01); *H04N 21/2665* (2013.01); *H04N 21/26603* (2013.01); *H04N 21/278* (2013.01); *H04N 21/4223* (2013.01); *H04N 21/44008* (2013.01); *H04N 21/4622* (2013.01); *H04N 21/478* (2013.01); *H04N 21/4722* (2013.01); *H04N 21/4788* (2013.01); *H04N 21/4823* (2013.01);

(Continued)

(58) Field of Classification Search
CPC ........... H04N 21/4826; G06K 9/00711; G06K 9/00718; G06K 9/00744
USPC .................................................. 725/51, 112
See application file for complete search history.

(56) References Cited

U.S. PATENT DOCUMENTS

| | | |
|---|---|---|
| 5,911,139 A | 6/1999 | Jain et al. |
| 6,711,293 B1 | 3/2004 | Lowe |

(Continued)

FOREIGN PATENT DOCUMENTS

| | | | |
|---|---|---|---|
| GB | 2458388 A | | 9/2009 |
| WO | WO 2009/061375 A1 | | 5/2009 |

(Continued)

OTHER PUBLICATIONS

IEEE 100, The Authoritative Dictionary of IEEE Standard Terms, 7th Ed., Dec. 2000, pp. 268-1007.

*Primary Examiner* — James R Sheleheda
(74) *Attorney, Agent, or Firm* — Mauriel Kapouytian Woods LLP; Serge Krimnus; Michael Mauriel

(57) ABSTRACT

A system and method of treating image data as a visual hash tag are presented. A device is able to subscribe to a content channel, possibly a channel that provide social media information, by the act of recognizing related objects without requiring a user to annotate content with unnatural hash tags.

24 Claims, 5 Drawing Sheets

Related U.S. Application Data

(60) Provisional application No. 61/915,724, filed on Dec. 13, 2013.

(51) Int. Cl.

| | | |
|---|---|---|
| *H04N 21/4223* | (2011.01) | |
| *H04N 21/278* | (2011.01) | |
| *H04N 21/84* | (2011.01) | |
| *G06K 9/00* | (2006.01) | |
| *H04N 21/44* | (2011.01) | |
| *H04N 21/4722* | (2011.01) | |
| *H04N 21/658* | (2011.01) | |
| *H04N 21/235* | (2011.01) | |
| *H04N 21/2385* | (2011.01) | |
| *H04N 21/462* | (2011.01) | |
| *H04N 21/478* | (2011.01) | |
| *H04N 21/4788* | (2011.01) | |

(52) U.S. Cl.
CPC ..... *H04N 21/4828* (2013.01); *H04N 21/6581* (2013.01); *H04N 21/84* (2013.01)

(56) References Cited

U.S. PATENT DOCUMENTS

| | | | |
|---|---|---|---|
| 7,016,532 B2 | 3/2006 | Boncyk et al. | |
| 7,477,780 B2 | 1/2009 | Boncyk et al. | |
| 7,565,008 B2 | 7/2009 | Boncyk et al. | |
| 7,565,139 B2 | 7/2009 | Neven, Sr. et al. | |
| 7,680,324 B2 | 3/2010 | Boncyk et al. | |
| 8,117,281 B2 | 2/2012 | Robinson et al. | |
| 8,244,830 B2 | 8/2012 | Robinson et al. | |
| 8,356,077 B2 | 1/2013 | Robinson et al. | |
| 8,429,103 B1 | 4/2013 | Aradhye et al. | |
| 8,503,787 B2 | 8/2013 | Boncyk et al. | |
| 8,510,238 B1 | 8/2013 | Aradhye et al. | |
| 8,566,866 B1 | 10/2013 | Fleischman | |
| 8,875,212 B2 | 10/2014 | Rakib et al. | |
| 8,897,572 B2 | 11/2014 | Hamsici et al. | |
| 8,953,895 B2 | 2/2015 | Kawanishi et al. | |
| 9,042,659 B2 | 5/2015 | Adamek et al. | |
| 9,223,804 B2 | 12/2015 | Swaminathan et al. | |
| 9,349,051 B2 | 5/2016 | Meredith et al. | |
| 9,544,655 B2* | 1/2017 | Soon-Shiong | H04N 21/4826 |
| 2007/0261070 A1 | 11/2007 | Brown et al. | |
| 2009/0199254 A1 | 8/2009 | White et al. | |
| 2010/0030578 A1 | 2/2010 | Siddique et al. | |
| 2011/0131241 A1* | 6/2011 | Petrou | G06F 17/30861 707/770 |
| 2011/0251896 A1 | 10/2011 | Impollinia et al. | |
| 2011/0289530 A1 | 11/2011 | Dureau et al. | |
| 2011/0295829 A1* | 12/2011 | Boncyk | G06F 17/30247 707/706 |
| 2011/0299782 A1* | 12/2011 | Hamsici | G06K 9/4671 382/195 |
| 2012/0011142 A1* | 1/2012 | Baheti | G06K 9/4671 707/769 |
| 2012/0102402 A1 | 4/2012 | Kwong | |
| 2013/0066750 A1 | 3/2013 | Siddique et al. | |
| 2013/0159412 A1 | 6/2013 | Robinson et al. | |
| 2013/0215116 A1 | 8/2013 | Siddique et al. | |
| 2013/0273968 A1 | 10/2013 | Rhoads et al. | |
| 2013/0287256 A1 | 10/2013 | Narasimha et al. | |
| 2013/0304854 A1 | 11/2013 | Mao et al. | |
| 2013/0305282 A1 | 11/2013 | Fleischman | |
| 2013/0305308 A1 | 11/2013 | Lee et al. | |
| 2014/0015979 A1 | 1/2014 | Wenger | |
| 2014/0123188 A1 | 5/2014 | Wood et al. | |
| 2014/0201227 A1 | 7/2014 | Hamilton-Dick et al. | |
| 2014/0321755 A1 | 10/2014 | Iwamoto et al. | |
| 2015/0046953 A1 | 2/2015 | Davidson et al. | |
| 2015/0058229 A1 | 2/2015 | Wiacek et al. | |
| 2015/0156531 A1 | 6/2015 | Atsmon et al. | |
| 2015/0189384 A1 | 7/2015 | Du et al. | |
| 2015/0339526 A1 | 11/2015 | Macciola et al. | |

FOREIGN PATENT DOCUMENTS

| | | |
|---|---|---|
| WO | WO 2012/054309 A1 | 4/2012 |
| WO | WO 2012/125010 A2 | 9/2012 |

* cited by examiner

VISUAL HASH TAGS VIA TRENDING RECOGNITION ACTIVITIES, SYSTEMS AND METHODS

This application is a continuation of U.S. application Ser. No. 14/564,448, filed Dec. 9, 2014, which claims priority to U.S. Application No. 61/915,724, filed Dec. 13, 2013. These and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

FIELD OF THE INVENTION

The field of the invention is digital content distribution technologies.

BACKGROUND

The following description includes information that may be useful in understanding the present invention. It is not an admission that any of the information provided herein is prior art or relevant to the presently claimed invention, or that any publication specifically or implicitly referenced is prior art.

As social media and social networks have grown in recent times, social media netizens continue to seek additional techniques through which they can obtain interesting content. The social media world, for the most part, has settled on the use of hash tags, that is a "#" symbol followed by a key word, to identify appropriately tagged content. The netizens can subscribe to such hash tags, possibly via Twitter®, to receive content that has been flagged with the hash tag. However, the use of such hash tags is quite problematic.

One problem with hash tags relates to a knowledge problem. It is impossible for a netizen to know, a priori, what hash tags exist. The netizen must discover such a hash tag, or create a new hash tag and hope that others decide to use it. A better approach would allow the netizen to naturally access content of interest via a content channel without having to dig through artificial constructs such as hash tags or annotate their content with metadata.

Some effort has been applied toward allowing users to obtain interesting content, outside of social media, based on image data. For example, U.S. patent publication 2013/0273968 to Rhoads et al. titled "Methods and Systems for Content Processing", filed Feb. 22, 2013, discusses various techniques for obtaining image-based search results. Furthermore co-owned U.S. Pat. Nos. 7,016,532; 7,477,780; 7,565,008; and U.S. Pat. No. 7,680,324 to Boncyk et al. describe various techniques for obtaining information based on characteristics derived from image data. Although useful with respect to object recognition, Rhoads and Boncyk lack provisions for construction of content channels.

With respect to annotating data, U.S. Pat. Nos. 8,117,281; 8,244,830; and U.S. Pat. No. 8,356,077 to Robinson et al. describe annotating content with metadata descriptors. The metadata descriptors allow social media users to establish social networks based on common interests. As discussed above, such an approach requires modification of content in some manner to add metadata descriptors. Robinson also fails to provide insight into naturally accessing or establishing content channels.

Additional effort has been directed toward using machine learning to improve a user's experience with respect to accessing content of interest. U.S. Pat. No. 8,429,103 to Aradhye et al. titled "Native Machine Learning Service for User Adaption on a Mobile Platform", filed Aug. 2, 2012, and U.S. Pat. No. 8,510,238 to Aradhye et al. titled "Method to Predict Session Duration on Mobile Devices Using Native Machine Learning", filed Aug. 14, 2002, both describe feature extraction and classification with respect to image data but fail to provide a mechanism by which users can determine the existence of a content channel or create a content channel based on image data.

Further progress toward matching users with content is described in U.S. patent publication 2013/0305282 to Fleishman titled "Topic to Social Media Identify Correlation", filed May 22, 2013. Fleishman seeks to identify correlations between user web identities and their social identities. Such correlations are then used to provide information, advertisements for example, to users. Although such correlations can be beneficial, Fleishman also lacks insight into connecting users to content channels in a natural, unobtrusive way.

Even further progress is made by U.S. patent publication 2009/0199254 to White et al. titled "Managing Media Content for a Personal Television Channel", filed Feb. 5, 2008. White provides for categorization of media content based on image features where the media content can be delivered via a personal television channel. White's approach allows for individual consumption of content, but does not provide for a social media experience where many individuals can interact via a common digital content channel in a natural way.

Thus, there still remains a need to allow users to subscribe to desirable feeds or streams via digital content channels in a more natural way without requiring use of hash tags. As described below in the Applicant's own work, users can engage with digital content channels by treating objects themselves as a kind of channel identifier. Based on the disclosed techniques, a user can access content related to an object by configuring their smart device to recognize the object from an image.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

SUMMARY OF THE INVENTION

The inventive subject matter provides apparatuses, systems and methods in which a computing device can subscribe to one or more channels of digital content based on recognizing features within a digital representation of a scene. One aspect of the inventive subject matter includes a digital content subscription system. Example systems can include a digital data processing module (i.e., hardware that includes software instructions store in a non-transitory, tangible computer readable medium where the instructions configure a processor to execute recited steps), a digital content channel database, and a subscription module. The digital data processing module is preferably configured to obtain a digital representation of a scene, possibly including one or more objects (e.g., posters, people, vehicles, buildings, toys, logos, album covers, etc.) or even symbols (e.g., bar codes, QR codes, matrix codes, alphanumeric, etc.). The processing module can apply one or more recognition algorithms (e.g., SIFT, BRISK, FREAK, ASR, OCR, edge-detection, etc.) to the digital representation to derive a set of descriptors where the descriptors exist within a descriptor space. For example, a SIFT descriptor might have values within a 128 dimension space (see U.S. Pat. No. 6,711,293 to Lowe titled "Method and apparatus for identifying scale invariant features in an image and use of same for locating an object in an image", filed Mar. 6, 2000). The channel database is configured store content channel identifiers that reference one or more digital content channels. The channel identifiers can be stored or indexed according to a schema that adheres to the descriptor space. Example content channels could include a feed or stream of data delivered to multiple devices over one or more network protocols (e.g., HTTP, TCP, SMS, MMS, etc.). The subscription module obtains the set of descriptors and generates a list of channel identifiers from the channel database. For example, the set of descriptors can be used to determine which known channel identifiers have corresponding descriptors that most closely align with the set of descriptors. The subscription module can further enable a device (e.g., cell phone, tablet, computer, appliance, etc.) to have an interaction with the corresponding digital content channels referenced by the channel identifiers. If no channel identifiers are considered relevant, then the subscription module can also instantiate a new digital content channel that can deliver content to the device or other subscribing devices.

Yet another aspect of the inventive subject matter relates to treating images or other recognizable objects as a visual social media hash tag. Exemplary methods can begin by obtaining image data, perhaps through an optical sensor (e.g., cell phone camera, gaming camera, security camera, etc.). A computing device, perhaps a person's smart phone, derives a content channel identifier from the image data. For example, a smart phone could be configured as a recognition engine via the iD™ Browser (see URL www.idbrowser.com), which can capture an image and generate a set of image descriptors from the image. The descriptors can be used to identify content channel identifiers within a channel database as discussed above. Once at least one channel identifier has been obtained, the method can further include configuring the computing device to receive digital content from a digital content channel (e.g., feed, stream, web service, etc.) as a function of a channel identifier. Thus, a person is able to treat objects, symbols, images, events, or other recognizable items as a conduit for digital feeds related to the object (e.g., social media feeds, etc.).

Various objects, features, aspects and advantages of the inventive subject matter will become more apparent from the following detailed description of preferred embodiments, along with the accompanying drawing figures in which like numerals represent like components.

DETAILED DESCRIPTION

Figure 1:
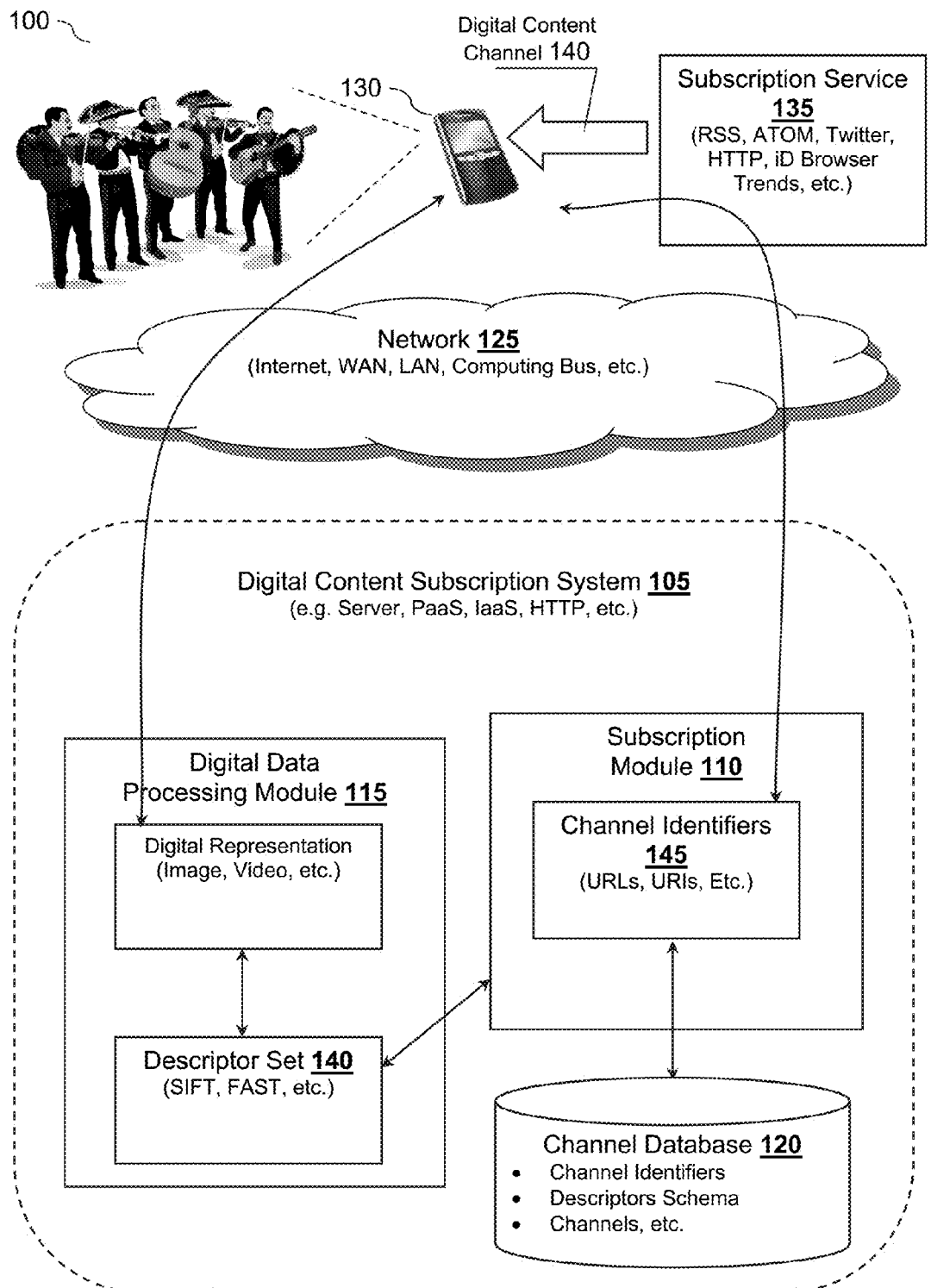
FIG. 1 is a schematic of a "visual hash tag" ecosystem.

Throughout the following discussion, numerous references will be made regarding servers, services, interfaces, engines, modules, clients, peers, portals, platforms, or other systems formed from computing devices. It should be appreciated that the use of such terms is deemed to represent one or more computing devices having at least one processor (e.g., ASIC, FPGA, DSP, x86, ARM, ColdFire, GPU, multi-core processors, etc.) configured to execute software instructions stored on a computer readable tangible, non-transitory medium (e.g., hard drive, solid state drive, RAM, flash, ROM, etc.). For example, a server can include one or more computers operating as a web server, database server, or other type of computer server in a manner to fulfill described roles, responsibilities, or functions. One should further appreciate the disclosed implementations of computer-based algorithms, processes, methods, or other types of instruction sets can be embodied as a computer program product comprising a non-transitory, tangible computer readable media storing the instructions that cause a processor to execute the disclosed steps. The various servers, systems, databases, or interfaces can exchange data using standardized protocols or algorithms, possibly based on HTTP, HTTPS, AES, public-private key exchanges, web service APIs, known financial transaction protocols, or other electronic information exchanging methods. Data exchanges can be conducted over a packet-switched network, the Internet, LAN, WAN, VPN, or other type of packet switched network.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other are in contact with each other) and indirect coupling (in which at least one additional element is located between the two elements). Therefore, the terms "coupled to" and "coupled with" are used synonymously.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

As used in the description herein and throughout the claims that follow, when a system, engine, or a module is described as configured to perform a set of functions, the meaning of "configured to" or "programmed to" is defined as one or more processors being programmed by a set of software instructions to perform the set of functions.

The focus of the disclosed inventive subject matter is to enable construction or configuration of a computing device to operate on vast quantities of digital data, beyond the capabilities of a human. Although the digital data, digital image data for example, represents a real-world object, it should be appreciated that the digital data is a representation of one or more digital models of the real-world object, not the real-world object itself. By instantiation of such digital models in the memory of the computing devices, the computing devices are able to manage the digital data or models in a manner that could provide utility to a user of the computing device that the user would lack without such a tool.

One should appreciate that the disclosed content distribution methods and systems provide numerous advantageous technical effects. For example, some embodiments of the content distribution systems allow users to subscribe to desirable feeds or streams of content via digital content channels in a more natural way without requiring use of hash tags. As described below in more detail, users can engage with digital content channels by treating objects themselves as a kind of channel identifier. Based on the disclosed techniques, a user can access content related to an object by configuring their smart device to recognize the object from an image.

Overview

FIG. 1 presents an ecosystem 100 in which digital representations of objects can become conduits of information. For example, an image of an object could be considered a visual hash tag for information bound or otherwise related to the object. In the example shown, a user captures a digital representation of a scene (e.g., a band performing music) that could include one or more objects, symbols, or other entities (e.g., members of the band, musical instruments, logo representing the brands of the musical instruments, clothing, and other accessories worn by the members, etc.) that can be rendered within the digital representation. Perhaps the object is a person, an album cover, a logo, a brand identifier, a vehicle, or other type of object. The digital representation is analyzed to extract one or more descriptors according to a an implementation of a processing algorithm where the descriptors can be correlated to the objects in the scene. The descriptors are then used to identify one or more digital content channels that provide content related to the object.

Contemplated ecosystem 100 includes a digital content subscription system 105 that allows computing and networked devices (e.g., mobile phone 130) to subscribe to digital content channels in a natural manner without requiring use of text-based hash tags. Furthermore, the subscription system also provides for construction of new content channels or for submission of content to existing channels. As illustrated, the subscription system 105 can include a digital data processing module 115, a channel database 120, and a subscription module 110 that work in concert to give rise to a natural engagement system that allows users to create, discover, or otherwise engage with recognized content via their suitably configured personal devices. Although the example presents the elements of the system 105 distributed over a network 125, it should be appreciated that each of the components could be embodied within a single computing device (e.g., game console, kiosk, smart phone, tablet, etc.) or distributed across multiple computing devices (e.g., smart phone and a local or remote server, appliance and web service, etc.).

For the sake of clarity, the following discussion presents the inventive subject within the context of an image-based recognition platform. A suitable image-based recognition platform that can be suitably adapted for use with the inventive subject matter includes the Applicant's own iD™ Browser technology (see URL www.idbrowser.com). Such technology can be based on the co-owned image recognition technology described in U.S. Pat. Nos. 7,016,532; 7,477,780; 7,565,008; and U.S. Pat. No. 7,680,324 to Boncyk et al. Still, it should be appreciated that the techniques described below can be adapted for use with other data modalities beyond image data. Example data modalities include audio data, video data, medical data, biometric data, shopping data, sports data, news data, sensor data, weather data, gaming data, or other types of digital representations. The digital representation can embody a representation of an object, symbol, scene, action, activity, or even an event.

In the example presented, a user captures a digital image (e.g., PNG, JPG, etc.) of a band, perhaps from an album cover or even live performance, as a digital representation of an object, the band in this case. The digital content subscription system 105 receives the digital representation, possibly over a network 125. The network 125 could be the Internet in distributed embodiments, LAN, WAN, VPN, PAN, or could even be an internal computing bus in a centralized platform. The digital data processing module 115 receives or otherwise obtains the image data as the digital representation of the object. In embodiments where the digital representation comprises image data as discussed above, the digital data processing module 115 can comprise one or more implementations of image processing algorithms that configure the module 115 to derive a set of image descriptors. Example descriptors could include invariant descriptors, metadata descriptors, facial descriptors, audio descriptors, or other types of descriptors depending on the data modality of the digital representation as well as on the implementation of the recognition algorithms configured to execute on the digital representation. Returning to the image-based scenarios, example image descriptors include SIFT descriptors, FREAK descriptors, FAST descriptors, DAISY descriptors, BRISK descriptors, Harris descriptors, MSER descriptors, edge-descriptors, or other types of known image descriptors or those yet to be invented that result from corresponding implementations of image processing algorithms. A suitable source, among others, for implementations of such algorithms includes the Open Computer Vision project (see URL www.opencv.org) or the Simple Computer Vision system (see URL www.simplecv.org).

Of particular note, the set of descriptors exist within a descriptor space. Consider the use of an implementation of SIFT (see U.S. Pat. No. 6,711,293) to generate the set of descriptors from the image data. A SIFT descriptor could have 128 dimensions, where the value of each of the 128 elements of the descriptor has a value of 0 to 255 (i.e., an unsigned byte). Therefore, the associated descriptor space would have 128 dimensions. It should be appreciated that the number of dimensions for a SIFT descriptor can be adjusted. With respect to the iD Browser technology operating on a smart phone, the smart phone implementation can use a 36 dimension descriptor while a back-end recognition services could use a full 128 dimension descriptor where more processing power is available.

The set of descriptors might be associated with a known object; that is, image data associated with a model object a priori captured before deployment in the field where each descriptor in the set of descriptor has a corresponding location or coordinate in the descriptor space. Perhaps an object in a scene might have 100 to 200, or more, corresponding descriptors. Thus, the set of descriptors might form a cluster of descriptors in the descriptor space, or might have cluster sub-structure (e.g., multiple clusters, width, distribution, contours, etc.), which can influence selection of a content channel as describe below. The a priori captured image data of an object is typically referred to as a training image. It should be appreciated that a 3D object could have multiple training images taken from different points of view, perspectives, lighting conditions, or under different circumstances. Thus, an object could be associated with many descriptor sets from all of the images.

In scenarios where the image data associated with an object is being processed for the first time to create the channel database discussed below, the set of descriptors related to the known object can be bound to one or more pieces of object information. Within the scope of this disclosure, the object information of most relevance is a channel identifier that is associated with a digital content channel. This advantageously gives rise to the ability to map the set of descriptors of recognized objects to a communication channel that provides content (e.g., feeds, streams, trends, etc.) related to the object itself. Thus, the object itself can be considered its own social media "visual hash tag".

The channel identifiers can be stored in the channel database where each content channel identifier can be indexed based on its corresponding object's set of descriptors. Example identifiers can include URLs, URIs, IP addresses, TCP or UDP ports, radio stations, wireless channels, optic fiber wavelengths (e.g., $\lambda$), or other channel identifier. Further, the channel identifiers could be unique identifiers (e.g., GUID, UUID, etc.) that point to channels such as URLs, URIs, IP addresses, or other network channels. In some embodiments, the channel database 120 can be a search engine, perhaps a remote database (e.g., SQL, Google, Wiki, YouTube, Facebook, Twitch, etc.), which indexes the channel identifier based on the descriptor values. While in other embodiments, the channel database could form a data structure, possibly in a memory of a device, that provides a nearest neighbor lookup (e.g., spill tree, kd-tree, etc.). One reason that the nearest neighbor lookup is considered useful is because when descriptors are derived in the field (i.e., when a consumer uses the technology), the descriptors are rarely identical to the a priori indexing descriptors used to construct the database, but still relatively close in the descriptor space.

The subscription module 110 obtains the set of descriptors as a foundational step toward identifying content channels of interest. One should note that the user is not required to annotate the image content with a hash tag or other type of tag (e.g., bar code, QR codes, etc.). The subscription module 110 can obtain the set of descriptors through various techniques including obtaining an XML, JSON, YMAL, or other type of file from the digital data processing module, reading a shared memory location, transferring a file over a network, or other suitable technique. The subscription module 110 uses the set of descriptors to generate a list of channel identifiers from the channel database where channel identifiers in the list are considered to correspond to descriptors that are at least near the set of descriptors generated from the image data or that satisfy the descriptor-based query. The list can be generated by submitting the set of descriptors to the channel database; in return the channel database could return the list as a results set. As alluded to previously, the list of channel identifiers are not required to have indexing descriptors that are an exact match to the set of descriptors. Rather, the identifiers could have indexing descriptors that are considered to be near the set of descriptors in the descriptor space.

The list of channel identifiers can take on many different forms. The channels can be ranked by the distance from their corresponding indexing set of descriptors to the set of image descriptors within the descriptor space or by other factors. Additional factors that could determine the ranking or influence the selection of the channels include location information (e.g., GPS, received signal strength, compressed signal sensing, zip code, etc.), time information (e.g., absolute time, relative time, etc.), context information, user preferences, relationship metrics between the user and other users (e.g., number of links via LinkedIn®, friends from FaceBook®, etc.), advertiser or promotional information, payment, or other parameters. Further, the list of channel identifiers could comprise a heterogeneous list of identifiers depending on the nature of the corresponding digital content channel. For example, the list could include a satellite radio channel identifier for audio data and a video streaming URL. Such an approach is considered useful in second screen experiences. The subscription module 110 uses the list of channel identifiers to enable a device (e.g., a mobile phone, a vehicle, a tablet, a phablet, a gaming device, a kiosk, an appliance, a set top box, a server, a computer, a virtual reality device, a projected reality device, a medical device, a point-of-sales device, a vending machine, an appliance, a toy, etc.) to have an interaction with at least one digital content channel identified by its corresponding channel identifier.

A typical interaction between the user device 140 and the digital content channel would include rendering content obtained from the digital content channel on the device, possibly by one or more content or media players. As many individuals submit content to the channel, possibly through the direct recognition of content via iD Browser-like technologies, the subscription services routes the content to the registered or subscribing devices. The device 140 then obtains the digital content from the channel, via the channel identifier, and renders it according to the content's format (e.g., images, videos, audio, games, promotions, application, etc.).

The digital content channel can deliver the related digital content via one or more techniques. In some embodiments, the channel comprises a broadcast channel while in other embodiments, the channel can comprise a multicast channel. Further, the content can range across a broad spectrum and can represent one or more types of content feeds: a medical feed, a social feed, an advertising feed, a curated feed, a programmed feed, a peer-to-peer feed, or other types of feeds. A network feed could be constructed, in some embodiments, as an HTTP or HTTPS feed transported over a TCP/IP connection between the user's device and a connect server for example. In other embodiments, the feed could comprise a UDP/IP communication channel for data that requires less reliability, or other type of communication conduit.

Still, additional interactions beyond mere rendering or consuming content could also be supported. Another type of interaction includes submitting content to the channel. In such an embodiment, a user might capture an image of the band as shown via the device 140; the image can be uploaded to the subscription service 105, which in turn identifies corresponding channels as described. The image can then be sent to all registered devices that have subscribed to the "object of interest".

An especially interesting type of interaction includes initiating a transaction with respect to the at least one digital content channel. The transaction could include a financial transaction or even a non-financial transaction. A financial transaction would include a purchase, an account withdrawal, an account credit, a credit or loyalty card transaction, healthcare payment, or other form of transaction that relates to a monetary exchange. An example of a non-financial transaction includes a protocol exchange, a login within an on-line account, a database transaction, a healthcare transaction, a prescription, or other type of non-monetary exchange.

One should appreciate that not all objects would have corresponding channel identifiers, or that the list of channel identifiers might fail to satisfy a user channel selection criteria. Perhaps the channel identifiers in the returned list might relate to other objects in a scene other than the one of interest to the user. Alternatively, the list of channel identifiers might have less than two channel identifiers (i.e., one, zero, NULL, etc.) that fail to satisfy the user. In such scenarios, the subscription module could be further configured to create a new digital content channel.

In embodiments where no channel identifiers are available or of interest, the subscription module can suggest creating a new channel or simply generate a new channel identifier. The new channel identifier can be generated from a list of available identifiers, a URL naming system or namespace, or other technique. As discussed above, the new channel identifiers can take on different forms, and does not necessarily have to be human readable; a GUID for example.

The subscription module can further instantiate a new digital content channel referenced by the new channel identifier. The subscription module can then store the new channel identifier within the channel database according to the corresponding set of descriptors thus making the new identifier and its corresponding digital content channel available to new subscribers.

As new devices subscribe to the services of the system, they can be registered with the content subscription services. As new content information is submitted to the system, the subscription services can use descriptors from the new content information to direct the content to all registered devices. In some embodiments, the descriptor set associated with a channel can be expanded based on additional similar content submitted by other content consumers. As a more specific example based on the iD Browser technology, as users leverage the iD Browser in an attempt to recognize objects via image or audio capture, the captured image and audio can be submitted to other registered devices that have expressed interest in such content. It should be appreciated that the system operates by binding the derived descriptors to the distribution channel without requiring users to artificially tag content with hash tags or keywords. Thus, users can naturally engage with interesting object-based content. It should be appreciated that the "trending" information generated via the iD Browser technology can now be considered object-based feeds.

Example Embodiment

The use of the iD Browser technology provides a foundation for an excellent, more detailed use-case of leveraging the inventive subject matter as an automated visual hash tag content distribution system. From the perspective of a method and again referring to FIG. 1, a device can subscribe to digital content by obtaining image data. The image data preferably comprises representations of one or more objects of interest. The computing device then derives a content channel identifier based on the image data, as discussed above. For example, the image data can be processed via an implementation of a SIFT algorithm to generate a set of SIFT descriptors. The device can then leverage the channel database to identify content channel identifiers that have been indexed or stored according to a schema within the same descriptor space as the SIFT descriptors. The device can be configured to receive digital content from a digital content channel as a function of the channel identifier. For example, in an embodiment where the channel identifier corresponds to an RSS feed URL, the device can begin receiving content submitted to the RSS feed by others as content to be consumed by subscribers.

If a channel already exists, the captured image data can be submitted to the channel. The submitted content within the iD Browser ecosystem can represent trending information related to objects of interest as well as content to be sent to other registered devices. If a channel does not exist, the iD Browser can create a channel as desired. Further, the image data might cause the generation of a descriptor set that does not necessarily have an existing channel, but could be considered as related to an existing known object. For example, the image data could correspond to a new point of view a known object. In such cases, the user could select one or more existing channels associated with the known object. The system then can expand the matching descriptor sets from those existing channels to include the new descriptors from the new point of view of the known object.

Figure 2:
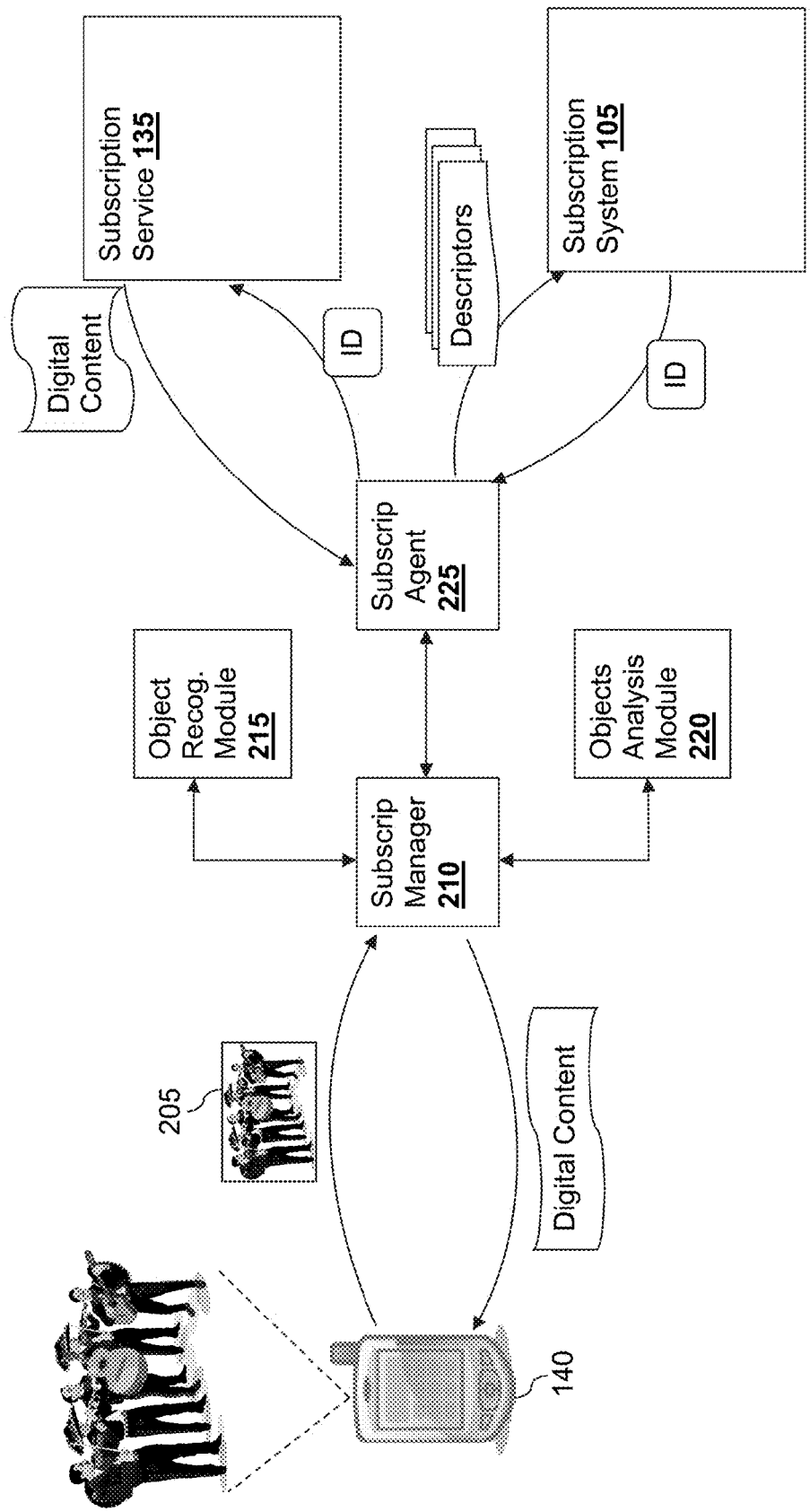
FIG. 2 is a schematic that illustrates the content subscription scheme from the perspective of a user device.

FIG. 2 illustrates the data subscription system from the perspective of a user device 140 according to some embodiments of the inventive subject matter. As shown, a user of the user device 140 captured a digital representation (e.g., an image, a video, etc.) of a musical band. The digital representation 205 is then sent to a subscription manager 210. The subscription manager 210 manages the interactions between the user device 140 by retrieving relevant digital content based on the image 205 and allowing the user to interact with the digital content via the device 140.

In some embodiments, the subscription manager 210 sends the image 205 to object recognition module 215. The object recognition module 215 is programmed or configured to perform a set of analyses on the image 205 that includes at least one implementation of an object recognition algorithm to derive/extract a set of descriptors from the image 205. As mentioned above, descriptors that are associated with different objects can be derived/extracted from the image 205 based on the pixel values within the image.

Figure 3:
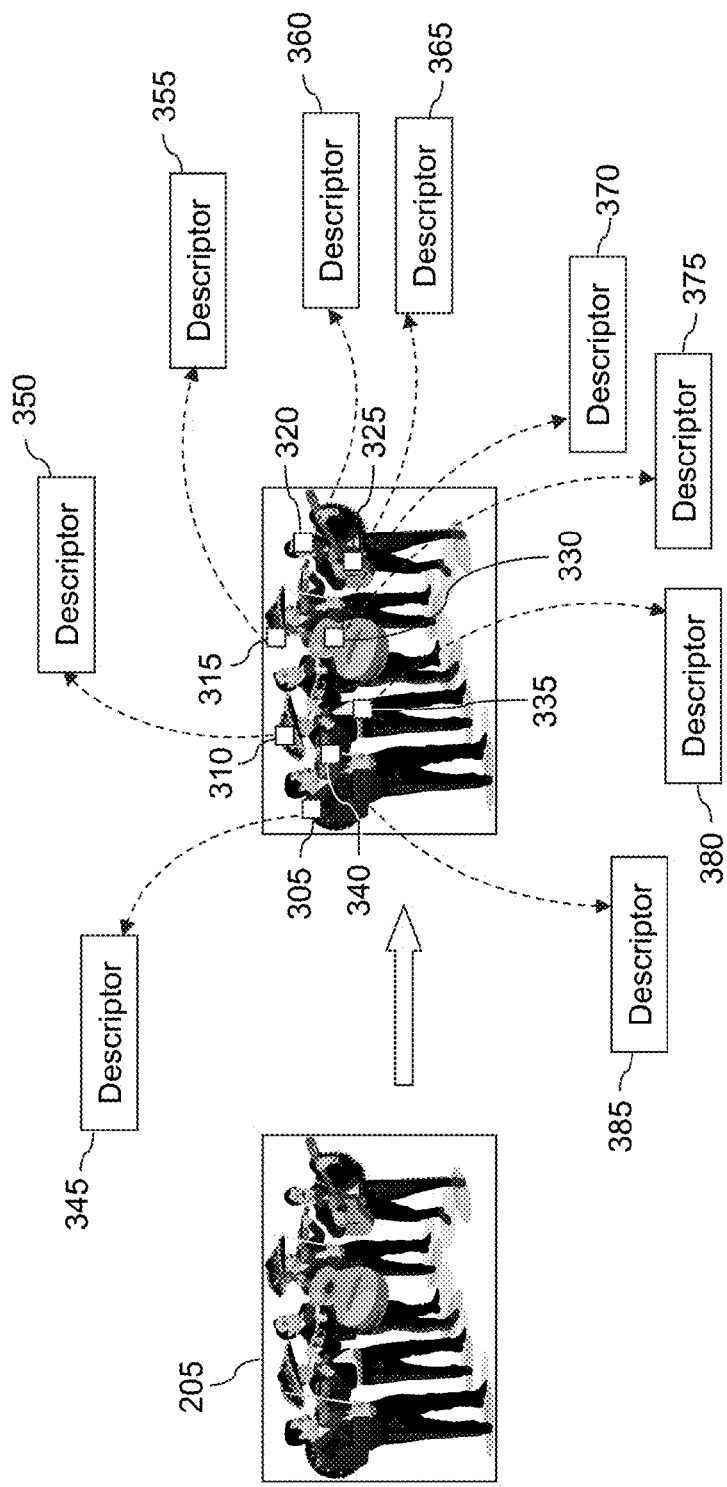
FIG. 3 illustrates the concept of deriving descriptors from an image.

FIG. 3 illustrates the process of deriving/extracting descriptors from the image 205 in more detail. To generate the descriptors, the object recognition module 215 is programmed to first identify a set of features (e.g., local features, global features, a combination of both local and global features, descriptors, etc.) within the data of the image 205. In one example, the object recognition module 215 can use an image recognition algorithm such as scale-invariant feature transform (SIFT; see U.S. Pat. No. 6,711,293 titled "Method and apparatus for identifying scale invariant features in an image and use of same for locating an object in an image" filed Mar. 6, 2000) to detect and describe local features (as descriptors) in images.

The identified features can include an area of the image 205 around the edges and/or corners of a detected object within the image 205. For example, the image 205 of the suitcase can have one or more descriptors that describe a facial feature of a band member, a part of a guitar, a part of the violin, a part of the hat worn by a member, etc. In this example, the object recognition module 215 has identified eight features 305-340 within the image 205 of the band to form the descriptor set 345-380. Preferably, the eight features 305-340 represent unique features of the band. Even more preferably, additional unique features are extracted from the image 205, possibly hundreds or thousands of features. For each identified feature, the object recognition module 215 is programmed to derive a descriptor (e.g., SIFT descriptors, Histogram of Gradients, etc.). The descriptor essentially characterizes one or more aspects (e.g., color aspect, gradient aspect, contrast aspect, etc.) of the corresponding identified feature. In this example, the object recognition module 215 derives descriptors from features on the faces of the members of the band in the image 205. The object recognition module 215 also derives descriptors from features of the hats worn by some of the members. The object recognition module 215 also derives descriptors from features of the logo and pattern of the musical instruments used by the members of the band.

Referring back to FIG. 2, once a set of descriptors has been derived by the object recognition module 215, the subscription manager 210 of some embodiments sends the set of descriptors to the objects analysis module 220. The objects analysis module 220 is programmed to analyze the set of descriptors and manipulate the descriptors based on the analysis. By reviewing the entire set of descriptors as a whole, the objects analysis module 220 is programmed to determine which descriptors are more relevant in the image 205 than others.

In some scenarios, the objects analysis module 220 can eliminate a subset of the descriptors if objects analysis module 220 determines that the subset of descriptors is not relevant or not as relevant as the remaining descriptors. In the present example, the user captured an image of a musical band. Therefore, after recognizing that the image includes facial features of all members of the band, the objects analysis module 220 can determine, according to one or more encoded rule sets, that the facial features, features associated with the name/logo of the band are more relevant than features associated with the logo of the guitar or the logo of the hat worn by a member. Based on this determination, the objects analysis module 220 can then eliminate the descriptors associated with the irrelevant features or give them a lower weight than the descriptors of the more relevant features.

On the other hand, if the image 205 shows only the face or part of the face of a member of the band, the objects analysis module 220 can determine that the features associated with the logo of the guitar and/or the hat is more relevant or just as relevant to the facial features, and thus gives more weights to the descriptors associated with the more relevant features.

The example image 205 here shows an image of a band, however, the contemplated system can make similar analysis on images of other objects, such as toys, street scenes, malls, groceries, healthcare images, people, products, vehicles, celebrities, etc.

After processing the set of descriptors, the subscription manager 210 sends the descriptors to the subscription agent 225 to be transmitted to the subscription system 105. The subscription system 105 uses the descriptors to determine one or more content channels for the user. In some embodiments, the subscription system 105 includes a database. The database stores a data structure that represents associations between descriptors and channel identifiers (channel IDs) as described above. Each channel ID corresponds to a particular digital content channel. Once the one or more channel IDs are determined based on the descriptors, the subscription system 105 sends the channel IDs back to the subscription agent 225. The subscription agent 225 is then programmed to subscribe to the digital content channels that correspond to the channels ID received from the subscription system 105. In some embodiments, the subscription agent 225 subscribes to these digital content channels by continuously (or periodically, e.g., once an hour, once a day, once a week, etc.) retrieving digital content associated with the digital content channels from one or more digital content sources. In some of these embodiments, the subscription agent 225 is programmed to use a subscription service 135 to subscribe to the digital content channels.

The subscription agent 225 in some of these embodiments establishes a persistent communication session with the subscription service 135 to continuously (or periodically, using a push or pull mechanism) retrieve digital content for the user device 140. The subscription agent 225 is also programmed to send the digital content retrieved from the subscription service 135 to the subscription manager 210. The subscription manager 210 then instructs the device 140 to render or otherwise present the digital content to the user via a display of the device 140.

Figure 4:
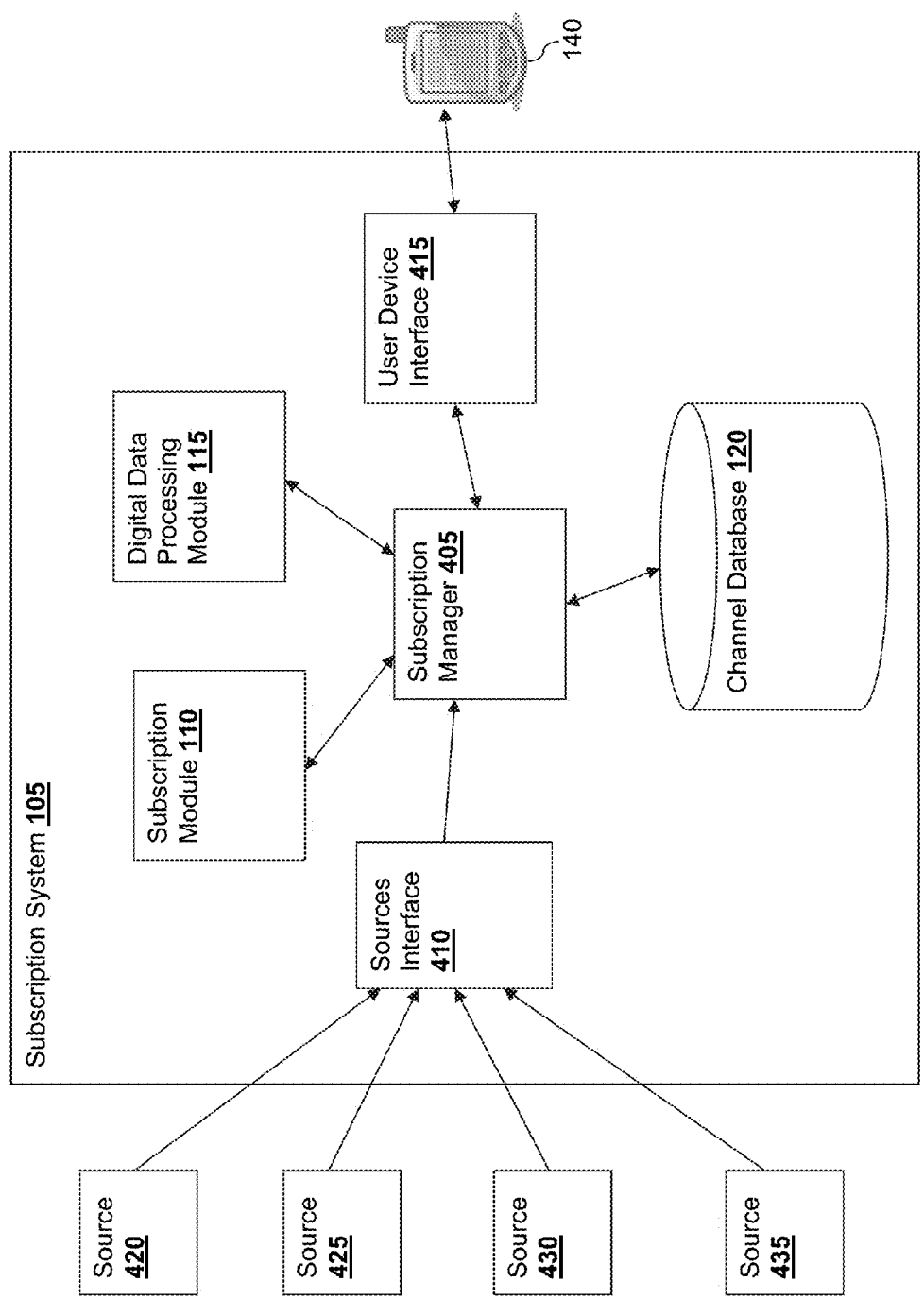
FIG. 4 is a schematic that illustrates the content subscription scheme from the perspective of a subscription system.

FIG. 4 illustrates creation, management, and subscription of content channels from the perspective of the subscription system 105 of FIG. 1. The subscription system 105 includes a subscription manager 405, a subscription module 110, a digital data processing module 115, a sources interface 410, and a user device interface 415. As shown, the sources interface 410 is communicatively coupled to different content sources (e.g., sources 420-435), possibly over a network (e.g., the Internet, a local area network, etc.). Examples of these content sources include media, press, entertainment companies, advertisers, corporations, etc.

These content sources are configured to supply new media content (e.g., images, videos, advertisements, games, application data, healthcare records, etc.) to the subscription system 105 from time to time. In some embodiments, when the subscription system 105 receives a new piece of content from one of the sources 420-435, the digital data processing module 115 of the subscription system 105 attempts to classify the new content under one of the existing content channels stored in the channels database 120. As mentioned above, each content channel is associated with a relevant context defined by a set of descriptors. When the digital data processing module 115 of the subscription system 105 receives the new content, the digital data processing module 115 is programmed to derive/extract a set of descriptors using the method described above by reference to FIG. 3. The digital data processing module 115 then compares the set of descriptors associated with the new content with different sets of descriptors associated with the different content channels. It is contemplated that an exact match between the sets of descriptors is not required, but when a set of descriptors associated with a particular channel has sufficient overlap (e.g., 80%, 90%, etc.) with the set of descriptors associated with the new content, the digital data processing module 115 is programmed to classify the new content under the particular channel. It is also contemplated that any new content can be classified under multiple channels when the set of descriptors associated with the new content has sufficient overlap with more than one set of descriptors associated with the different channels. For example, an image of a band might be classified as belong to multiple channels: a band channel and channels for each visible band member.

Once the new content has been classified by the digital data processing module 115, the subscription manager 405 stores an identifier of the content source (e.g., a URL, a link, a unique file identifier, etc.), and its association with a channel identifier in the channel database 120.

As shown in FIG. 4, the user device interface 415 of the subscription system 105 is communicatively coupled to a user device 140, possibly over a network (e.g., the Internet, a local area network, etc.). When the subscription system 105 receives a subscription request via the user device interface 415, the subscription manager 405 forwards the request to the subscription module 110 to determine which content channels fit the criteria based on the request. In some embodiments, the request also includes a media file (e.g., an image, a video, medical record, etc.). In these embodiments, the subscription module 110 is programmed to first derive/extract a set of descriptors based on the received media file using the method described above by reference to FIG. 3. The subscription module 110 of some embodiments is also programmed to perform functions similar to that of the objects analysis module 220 to further refine the set of descriptors derived from the media file. In other embodiments, the device 140 includes an object recognition module (such as object recognition module 215) that derives/extracts a set of descriptors based on the media file and sends the set of descriptors to the subscription system 105.

Once a set of descriptors associated with the media file is obtained, the subscription module 110 compares the set of descriptors associated with the media file with the different sets of descriptors associated with the different content channels stored in the channel database 120. As mentioned above, it is contemplated that an exact match between the sets of descriptors is not required, but when a set of descriptors associated with a particular channel has sufficient overlap (e.g., 80%, 90%, etc.) with the set of descriptors associated with the media file, the subscription module 110 is programmed to identify the particular channel as relevant to the subscription request. It is also contemplated that multiple channels can be identified as relevant to a single subscription request.

As mentioned above, the channel database 120 stores content channels information and identifiers of the sources of content that is classified under the channels. Once the channel(s) is identified, the subscription system 105 uses a subscription service (such as subscription service 135) to provide content to the user device 140 based on the identified channel and the sources classified under the channels.

One of the many benefits of using this system in subscribing to content channels (e.g., searching for relevant content) instead of other conventional keyword based method, such as searching over Google®, is that using an image to search provides additional context much more efficiently that will not be present in keywords. For example, a user who types in a keyword "beetle" can mean a type of bug, or a type of car. An image of a Volkswagen Beetle eliminates the confusion. In addition, the surrounding scene within the image can also provide additional clues or context that allows the objects analysis module 220 of FIG. 2 to manipulate the set of descriptors to provide more accurate representation of the search criteria.

Figure 5:
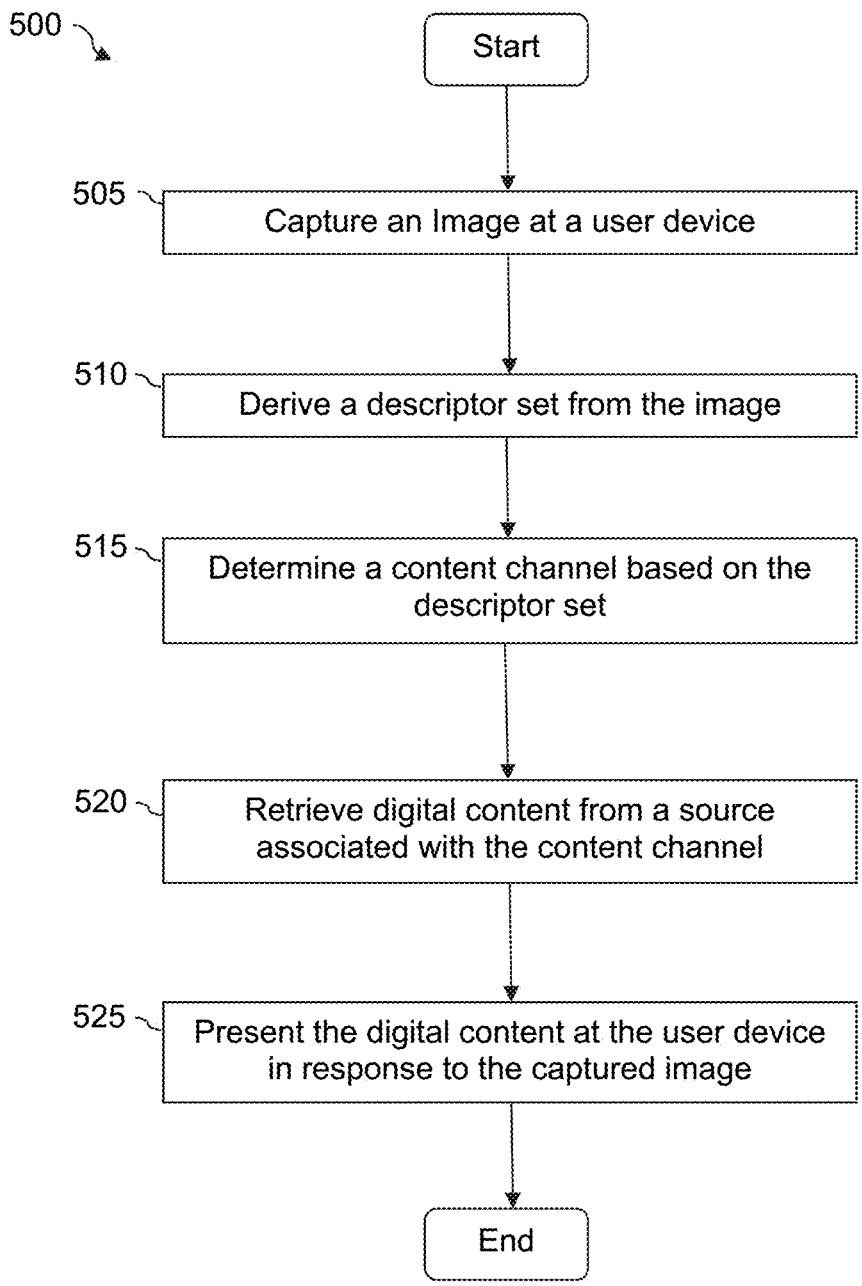
FIG. 5 illustrates a process for subscribing content according to some embodiments of the inventive subject matter.

FIG. 5 illustrates a process 500 for subscribing content using a user device according to the inventive subject matter disclosed herein. The process 500 begins by capturing (at step 505) an image using a camera of a user device. The image will be used as a search key in identifying content channels that are relevant to the user. The process 500 then derives (at step 510) a set of descriptors from the image. The set of descriptors includes descriptors associated with different unique features identified on the image. Preferably, the descriptors provide sufficient information such that different physical objects captured in the image can be identified. In some embodiments, the set of descriptors can be further refined by performing analysis on the image and the set of descriptors as a whole, as described above by reference to FIG. 2. Once a refined set of descriptors is obtained, the process 500 determines (at step 515) one or more content channels that are relevant to the user based on the refined set of descriptors. In some embodiments, this determination step is performed by matching the refined set of descriptors with different sets of descriptors associated with different content channels.

After determining the content channels, the process 500 retrieves (at step 520) digital content from the sources that are classified under the determined content channels. Finally, the process 500 presents (at step 525) the retrieved digital content at the user device in response to capturing of the image.

Additional Considerations

The feeds provided via the digital content channels can include many different types of information related to the objects, events, symbols, or brands of interest depending on the nature of the target environment (e.g., medical environment, shopping environment, navigation environments, telemedicine environment, genomic analysis environment, etc.). Example feeds could include information such as inventory information based on recognized products, rates of change of object information based on biometrics, traffic flow based on recognized vehicles, items purchased based on recognizing brands or a shopper, Big Data analytics information, event triggers, x-ray or medical information based on recognizing a patient or healthcare provider, micro-blogs based on correlations to other data modalities, or other types of feeds.

When the content channel database is constructed, the channel identifiers are stored according to a schema that operates as a function of the corresponding descriptor space and based on descriptors generated in a modeled or controlled setting. However, in the field, it is unlikely that a user's or consumer's device will generate an identical descriptor due to the varied environment in the field. Thus, the sets of descriptors used to recognize objects have an inherent fuzziness relative to the sets of descriptors used to store or index the channel identifiers. One aspect of the inventive subject matter, as discussed above, is considered to include resolution of the fuzziness through nearest neighbor searches. Further, the substructure of descriptor clusters can aid in determining how to map to channels of interest. The channel identifiers can also be indexed or otherwise tagged with cluster information such a cluster distribution information (e.g., Gaussian, Poisson, etc.), fit information (e.g., G-Test, $\chi^2$, etc.), centroid, center of mass, or other cluster information. Should such information fail to resolve the fuzziness among apparently relevant channels, the users can be presented with an option to select which channel would the desired channel. Alternatively, the channel list could be presented to the user based on a fee schedule where the list is ordered by two factors: the nearest of the identifiers within the descriptor space as weighted by how much a third party pays (e.g., advertisers).

The disclosed techniques also allow for one or more of the following:

Cross modality recognition: Recognizing the voice of a signer and associating the captured content with channels that are bound to corresponding album covers;

Binding people with brands: Recognizing a person's face and submitting related content to channels that are correlated with images of a celebrity, movie posters, or other brands;

Automated feed generation: Recognizing activities or monitoring recognition trends represent collection of such data as feed data where the system automatically determines to which "visual tag" the content belongs or to which channel the content should be routed;

User engagement: Users can select among existing tags or channel to determine how to bind their feed data; and Modality Selection: Users can choose from which modalities or features of captured data to establish channels.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A digital content subscribing device comprising:
   a display;
   a non-transitory computer readable memory storing software instructions; and
   a processor coupled with the display and the non-transitory computer readable memory, and that, upon execution of the software instructions, operates as:
      a recognition module configurable to:
         acquire a digital image that includes images of a plurality of objects; and
         derive a set of descriptors associated with the plurality of objects from the digital image as a function of an implementation of at least one object recognition algorithm;
      an object analysis module coupled with the recognition module and configurable to:
         identify subsets of descriptors relevant to object features of objects in the plurality of objects;
         recognize some of the plurality of objects as recognized objects as a function of the subsets of descriptors; and
         weight the subsets of descriptors according to relevancy rules as a function of the recognized objects thereby forming weighted subsets of descriptors; and
      a subscription agent coupled with the object analysis module and configurable to:
         receive a list of content channel identifiers for the recognized objects based on a submission of the weighted subsets of descriptors as a query to a channel database;
         subscribe to at least one digital content channel associated with the recognized objects based on content channel identifiers;
         render, via the display, digital content from the at least one digital content channel and retrieved from a source device.

2. The device of claim 1, wherein the digital image comprises video data.

3. The device of claim 1, wherein the digital image comprises at least one of the following: a healthcare image, a media file, and an x-ray.

4. The device of claim 1, further comprising a computing device that includes the display, the non-transitory computer readable memory, and the processor operating as the recognition module, the object analysis module, and the subscription agent.

5. The device of claim 4, wherein the computing device includes at least one of the following: a mobile phone, a vehicle, a tablet, a phablet, a game console, a kiosk, an appliance, a set top box, a server, a computer, a virtual reality device, a projected reality device, a point-of-sales device, a vending machine, and a toy.

6. The device of claim 1, further comprising a medical device that includes the display, the non-transitory computer readable memory, and processor operating as the recognition module, the object analysis module, and the subscription agent.

7. The device of claim 1, wherein the plurality of objects comprises different objects.

8. The device of claim 1, wherein the recognized objects include at least one of the following: a poster, a person, a vehicle, a building, a toy, a logo, an album cover, a product, a celebrity, and a symbol.

9. The device of claim 1, wherein the recognized objects include at least a portion of a patient.

10. The device of claim 9, wherein the at least a portion of a patient includes a face.

11. The device of claim 1, wherein the at least one object recognition algorithm includes one of the following algorithms: SIFT, FREAK, FAST, DAISY, BRISK, Harris, edge detection, and MSER.

12. The device of claim 1, wherein the subsets of descriptors include at least one of the following types of descriptors: SIFT descriptors, FREAK descriptors, FAST descriptors, DAISY descriptors, BRISK descriptors, Harris descriptors, MSER descriptors, and edge descriptors.

13. The device of claim 1, wherein the channel identifiers include at least one of the following: a URL, a URI, an IP address, a TCP port, a UDP port, a radio station, a wireless channel, a wavelength, a GUID, and a UUID.

14. The device of claim 1, wherein the query is submitted over a network to a search engine operating as the channel database.

15. The device of claim 1, wherein a list of content channel identifiers comprises a ranked list of the content channel identifiers.

16. The device of claim 15, wherein the content channel identifiers are ranked as a function of at least one of the following: a distance from the subsets of descriptors to corresponding indexing descriptors, a device location information, a time information, a context information, a user preference, a relationship between users, an advertiser information, a payment, and a fee schedule.

17. The device of claim 1, wherein the digital content comprises a medical feed.

18. The device of claim 1, wherein the digital content comprises biometrics.

19. The device of claim 1, wherein the digital content comprises healthcare records.

20. The device of claim 1, wherein the digital content comprises at least one of the following: a social feed, an advertising feed, a curated feed, a programmed feed, and a peer-to-peer feed.

21. The device of claim 1, wherein the digital content comprises at least one of the following types of content: image content, video content, advertisement content, application data, and game content.

22. The device of claim 1, wherein the subscription agent is further configurable to use the channel identifiers to subscribe to the at least one digital content channel by establishing a communication session with the source device.

23. The device of claim 22, wherein the communication session is a persistent session.

24. The device of claim 22, wherein the subscription agent is further configurable to retrieve the digital content from the source device via at least one of: a continuous feed, a periodic feed, a push feed, and a pull feed.

* * * * *